Feb. 11, 1969

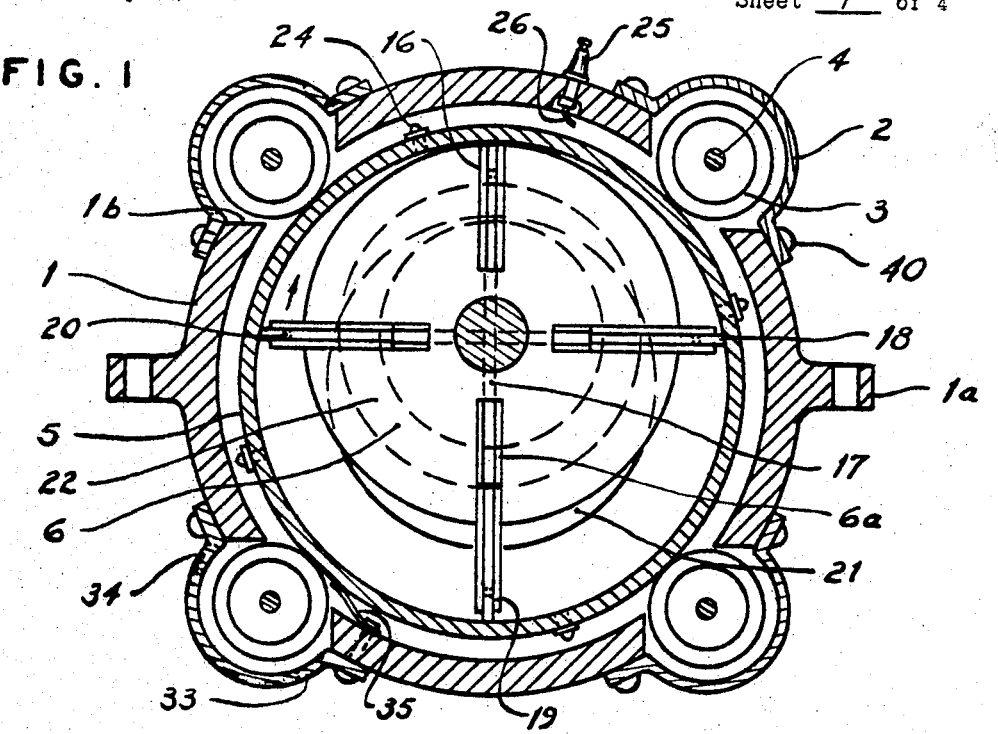

D. A. KELLY 3,426,735

COMPOUND ROTARY ENGINES

Filed July 26, 1967

INVENTOR.
Donald A Kelly

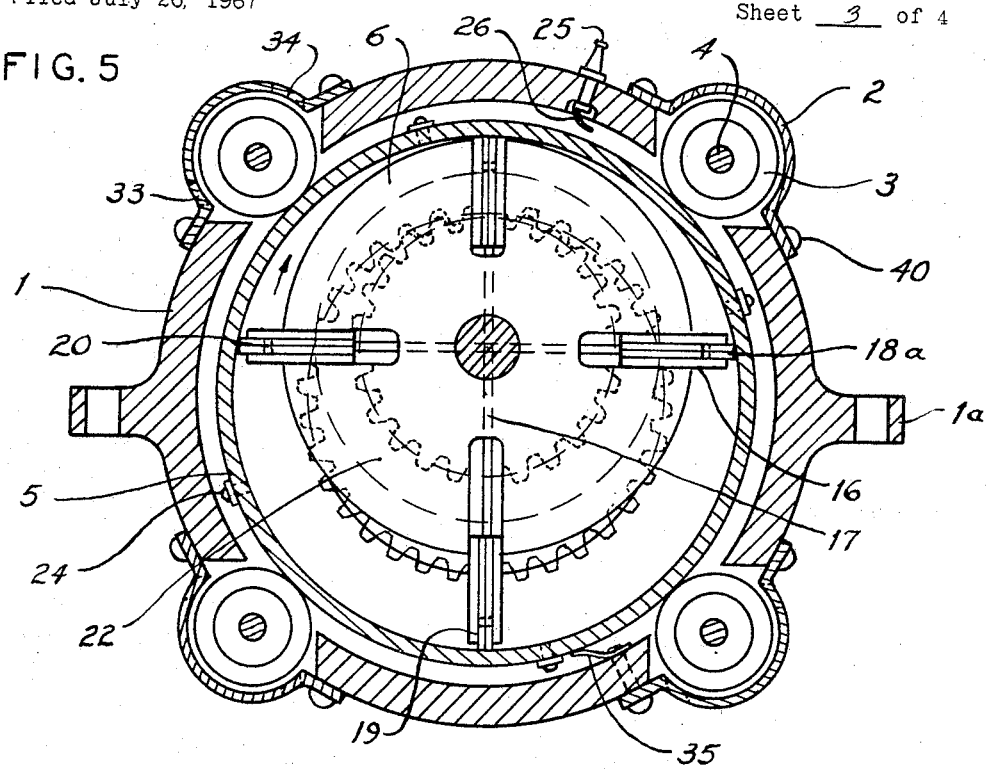

INVENTOR.
Donald A. Kelly

United States Patent Office 3,426,735
Patented Feb. 11, 1969

3,426,735
COMPOUND ROTARY ENGINES
Donald A. Kelly, 58—06 69th Place,
Maspeth, N.Y. 11378
Filed July 26, 1967, Ser. No. 656,172
U.S. Cl. 123—16
Int. Cl. F02b 53/08; F01c 3/02; F04c 17/18
10 Claims

ABSTRACT OF THE DISCLOSURE

A rotary internal combustion engine comprising two rotating elements which together with multiple sealed vanes form the continuous compression and combustion volumes. The eccentric rotor is in tangent contact with a large diameter flanged cylinder which has large diameter openings at the ends in order to provide for the intake and exhaust gasses. The rotating flanged cylinder is concentric to the basic cylindrical housing and is supported by multiple rollers for high speed, low friction rotation. The flanged cylinder is forced air cooled by impellers on each of the multiple ball bearings. The flanged cylinder is fitted with multiple spark plugs which contact a high tension wiper off top dead center to fire the gas mixture. This arrangement of commutated ignition assures accurate spark timing.

Four vane and seal assemblies are ideal for most applications of moderate horsepower with six to eight being suitable for large engines.

---

This invention relates to a departure in rotary internal combustion engine design wherein two rotating elements co-act to form the compression volume. Since one of the major problems in achieving a long-lived, maintenance free rotary engine is efficient sealing of the power vanes, the compound rotary arrangement was conceived to meet this requirement.

This type of I.C. rotary engine is generally similar to the centrifugal gas turbine in operation since both are directly impelled by a compressed and ignited gas force acting on a vaned rotor. The basic difference between this I.C. rotary and the centrifugal turbine is that the rotary engine vanes are sealed and operate at higher compression ratios while the turbine rotors are freely revolving. This difference in mode leads to specific operating characteristics wherein the free turbine operates at higher speeds and consumes fuel at a relatively high rate while the I.C. rotary runs at lower rates due to its higher compression ratio.

In view of these operating characteristics the compound rotary I.C. engine provides the additional feature of low seal wear so critical in the rotary engines. This compound rotary engine should be considered as filling the application spectrum between the latest gas turbines and the conventional compression ignition (Diesel) engines, and in that capacity provides great versatility for many vehicular types.

Some of the features that make the compound rotary attractive for many applications are its basic simplicity and direct shaft output which means lower initial costs and lower operating costs. Instead of expensively formed precision turbine blades with complex regeneration requirements the compound rotary requires only simple vanes and seals with a plain rotor transmitting torque to the output shaft. The compound rotary engine compression ratio of about 8 to 1 would be quite higher than the corresponding gas turbine pressure ratio, equivalent but lower than an equivalent diesel.

Other factors in favor of the compound rotary are its ease of maintenance and simple requirements for servicing and overhauls.

A survey of all I.C. rotary engines leads to the conclusion that many are hampered by excessive seal wear due to high speed operation and the attendant cooling and lubrication problems. The compound rotary should overcome most of these problems within a reasonable volume module.

It is quite possible that through extensive development effort the compound rotary may reach the high power-to-weight ratios of the best of the gas turbines, while matching the economy of the diesel at a lower initial cost and lower operating costs than either of these engine types.

The usual multiple vane and eccentric rotor elements are employed in this engine design with the spring-loaded seals providing the necessary pressure between the rotor and flanged cylinder for mutual rotation. The eccentric rotor is in tangent contact with a larger diameter flanged cylinder which has large diameter openings at the ends for intake and exhaust provision. This arrangement provides a full rotating surface for both end and side seals so that high speed seal friction is eliminated. There is a differential motion imposed on the seals due to the difference in rotor and flanged cylinder diameter and their eccentricity, but this is of small magnitude compared to the normal rotor peripheral speed.

Since the crescent-shaped open areas at both ends are less than ideal for rapid exhaust removal, the rotor ends must be rounded off to provide additional exhaust area, without appreciably diminishing the intake compression volume.

A study of the geometry involved will indicate that area trade-offs will be necessary in order to reach an optimum operating efficiency. It is believed that an empirical approach to an optimum solution will be satisfactory, since an analytical approach involves too many variables and intangibles such as natural speed, based on an uncertain compression ratio, operating temperature, frictional load due to thermal expansion and combustion effectiveness.

The rotating flanged cylinder is freely suspended on multiple gas film rollers mounted at the periphery of the engine housing. The flanged cylinder rotates concentrically to the engine housing bore with an air gap for the commutated ignition system. The gas film rollers are supported by half-cylindrical shells which are secured to the engine housing. Half of the gas film rollers may be spring-loaded or adjustable in order to compensate for increased flanged cylinder diameter due to thermal expansion. The flanged cylinder must freely rotate with the gas film rollers with no binding overload.

If all the gas film rollers are made adjustable this would provide a means of changing the compression ratio slightly, since a small gap could then exist between the rotor and the flanged cylinder instead of the normal tangent contact.

The gas film rollers may be of the flanged type which would provide a means of eliminating undesirable end play in the flanged cylinder. There should be a slight controlled air gap between the end flanges of the flanged cylinder and the inside surfaces of the housing end plates, so that no friction is realized between the four end surfaces. The air gaps in the area of the intake and exhaust crescent must be sealed to prevent intake fuel/air mixture loss and premature exhaust escape. The sealing in this area could be of the non-contacting labyrinth type to eliminate friction. This type of sealing should be satisfactory since the down-stream draft in the exhaust manifold will draw off the exhaust rapidly over the gap areas.

A major consideration for the proper long-life operation of the compound rotary engine is the choice of the gas film roller type and diameter. The roller diameter is critical since the rotary engine normal speed is in the 2000 to 4000 r.p.m. range and therefore the supporting roller speed will be from 3 to 5 times this speed, under average loading conditions. No shock loading is imposed on the rollers since the motive force causes the flanged cylinder to roll within the roller contact perimeter and is closely retained by them, as previously described.

The length of the rotor in the working cavity must be a close fit to the inside faces of the end flanges of the flanged cylinder in order to prevent compression leakage. Although these surfaces are subjected only to differential rotation this may be at a fairly high rate so that lubrication will be required. The most expedient lubrication means may be the oil-in-fuel method as in two-cycle I.C. engines. This added lubrication will also aid in extending seal life and other portions that are subjected to this differential motion.

The rotor ends must be rounded off and stepped so that the total rotor length is equal to the total length of the flanged cylinder. The stepped ends provide a limiting outline to the intake/exhaust crescent which along with the shaped end plates define the total working crescent areas. A study of the drawings will make this description more apparent and easier to follow.

A novel feature of the overall compound rotary concept is the application of forced air cooling by air impellers revolving with the high speed gas film rollers. Openings in the roller shells will provide for air entrance and thereby provide a continuous high-speed air flow over the revolving flanged cylinder. Air outlets are provided, in line with the peripheral air gap, within the two housing end plates.

The rotor is slotted and bored in the usual manner of the eccentric rotor and vane type of rotary engine. This engine design provides positive displacement and sealing since the multiple vane and seal assemblies are slightly longer than the inside diameter of the flanged cylinder. Since the rotor axis is not the same axis as the flanged cylinder, this fixed offset distance requires that the vane assembly lengths be slightly less than the full inside diameter.

This slight differential gap is represented by the formula: $-2A-r$ in which $a$ is the radial length of the vane and $r$ is the radius of the bore. $a$ is obtained by $r-b$ in which $b$ is the fixed offset distance. This differential gap is based at the vane centerline and neglects the thickness of the vanes. The vane ends should have the same radius as the radius of the flanged cylinder bore, so that the seal protrusion be minimized. The vane seals and springs compensate for the varying gap between vane ends and the flanged cylinder bore and provides the means of continuous, reliable pressure sealing.

For larger engines with higher operating pressures the vane seals will require stronger springs to maintain complete sealing contact with the working bore. The spring force must be consistent with the operating pressures involved in order that the seal wear will not be unnecessarily high.

Opposite vane assembly sets are connected by twin rods or tubes of fixed length which run through corresponding radial holes in the rotor. The vanes closely fit in the slots of the rotor so that no pressure leaks occur in the slots. The rods or tubes do not touch the holes within the rotor.

The vane seals may be made in one piece shaped in the form of a U, for full pressure sealing. The vane seals may be made up of three pieces, one end seal and two side seals, which are exactly half-lapped at the ends to insure a close fit at the lapped faces while providing independent seal movement against the cylinder walls. The vane seals and springs are fitted into precision dado slots in the outer edges and are retained by the flanged cylinder, at assembly.

A compound seal may be utilized for high compression ratio engines in which two or more sealing strips are connected by support strips. The thin support strips provide mutual rotational support for each seal strip while allowing each to move radially, independent of the other strips. The support strips would be used for both end and side seals.

This arrangement should provide reliable continuous sealing under high combustion pressures, since each sealing element is independently held against the walls of the flanged cylinder. The failure of one seal will not prevent the continued operation of the engine. The material for the seals may be filled Reflon or Viton which exhibit low frictional coefficient and relatively long life. Other sealing materials may be chosen for certain specific applications. Where a seal material shows exceptionally long life a simple silicone rubber strip may effectively be applied as a substitute for the metal springs.

The multiple co-acting vanes are set in appropriate precision sloth in the rotor and are thereby guided in their diametrical displacement when the rotor revolves. The depth of the radial vane slots in the rotor is based on a vane being fully retracted into it in the top vertical position with a minimum of bottom clearance for rotor integrity.

For most applications the rotor width is divided into two equal space assignments, one of which is for the multiple vane tube or rod assemblies, and the remaining one for the drive shaft bore. The rotor strength and solidarity must be considered when assigning vane height and shaft bore length, for each engine HP rating.

In addition to the commutated ignition system described, ignition may be obtained by placing the multiple spark plugs within the rotor which will then require insulated extension contacts and a fixed center contact which carries the high potential. In this arrangement the auxiliary rear shaft must be of relatively large diameter and be hollow to permit the fixed center conductor rod to extend into the area of the spark plug extension contacts. The conductor rod must be supported by a bracket mounted on the rear end plate. The contact point on the conductor rod would be oriented at about 10 to 15 degrees off top dead center to assure proper combustion.

The multiple spark plug extension contacts must be radially in line with the single center contact point to assure proper uniform contact. This arrangement has the advantage of assuring exact ignition timing with respect to the vanes, and therefore the compression volume. Since one set of vane rods restricts the placement of the spark plugs they must be placed near the rear end of the rotor. It may be possible to provide additional spark plugs along the rotor by providing additional insulated axial conductors which are connected to a corresponding extension contact. The spark plug electrodes are recessed in cavities slightly below the surface of the rotor.

Another variation in the compound rotary engine would be the addition of end gears on the rotor and flanged cylinder which would provide an accurate rotation relationship between the two elements. This arrangement would be suitable for the external commutated type of ignition where there is normally no positive relationship between the vanes and the flanged cylinder. The gearing would provide a fixed relation between the vanes and spark plug firing position for optimum combustion conditions.

The non-geared type of compound rotary may have elongate notches on the inside diameter of the flanged cylinder in lieu of gears which serve to keep the vanes generally oriented with respect to the spark ignition to insure an adequate combustion volume.

The principal object of the invention is to create a compound rotary internal combustion engine with low or negligible seal wear when operated at high speeds.

It is an object of the invention to produce a compound rotary engine which is relatively inexpensive to manufacture by the application of basic geometric shapes.

It is an object of the invention to create a compound rotary internal combustion engine with a high compression ratio by geometry and novel sealing techniques.

It is an object of the invention to produce a rotary internal combustion engine which is simple to assemble, service and maintain.

It is an object of the invention to create a compound rotary engine which can possibly be developed into a combustion ignition engine for increased economy of operation.

Other features and possibilities will become apparent from the following description of the compound rotary engine design.

It should be understood that variations may be made in the detail engine design without departing from the spirit and scope of the invention.

In the accompanying drawings:

FIGURE 1 is a front sectional view through the main housing showing the two rotating elements.

FIGURE 2 is a side sectional view through the main housing showing the two rotating elements.

FIGURE 5 is a front sectional view through the main housing showing a gearing arrangement.

FIGURE 6 is a side sectional view through the main housing showing a gearing arrangement.

Figure 3:
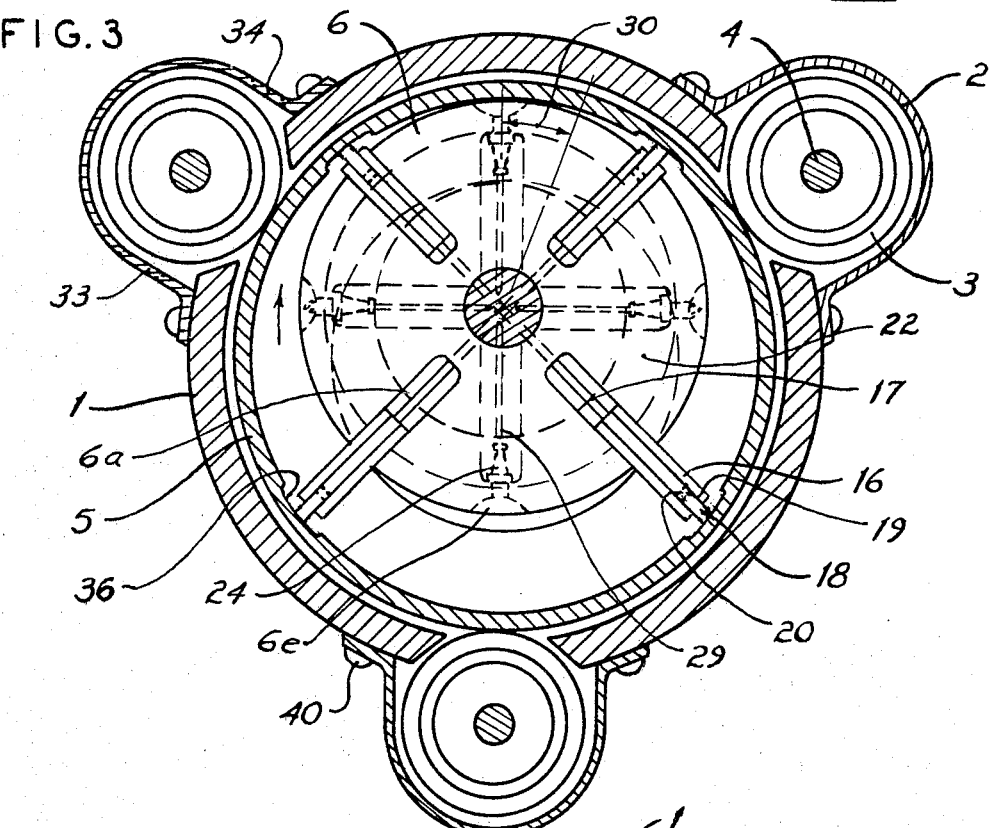
FIGURE 3 is a front sectional view through the main housing showing ignition elements within the rotor.

Referring now in more detail to the accompanying drawings, numeral 1 indicates the main engine housing on which are mounted multiple half-cylindrical shells 2 which are secured by the screws 40. Gas film rollers 3 are supported by the half-cylindrical shells 2 with the pins 4.

The flanged cylinder 5 is made up of a high alloy steel cylinder 5a and two identical steel end rings 5b which are secured to the cylinder 5a by the multiple flat head screws 5c. The flanged cylinder must be made pressure tight within its cross-sectional U shape and have extremely fine finished interior surfaces with RMS 16 being the maximum.

The flanged cylinder 5 is radially restrained by the gas film rollers 3 and adjusted to roll freely within the multiple roller tangency points.

The slotted and bored rotor 6 is supported by the shaft 7 and the accessory shaft 8. The accessory shaft 8 serves as a support means to provide full alignment for the rotor 6 within the main housing 1. The flathead screws 41 secure the accessory shaft 8 to the rotor 6 end.

The end plates 10 and 11 are secured to the main housing 1 by the machine screws 42.

The end plate 10 carries the bearing 12 in which the shaft 7 revolves. The bearing 9 in the housing end plate II supports one end of the rotor by means of the accessory shaft 8.

The front flange 13 which carries the other front bearing 12 is secured to the end plate 10 by the screws 43.

The rectangular key 14 secures the rotor 6 to the shaft radially, and the screw 44 holds the shaft 7 to the rotor axially. The clearance hole 15 in the rotor 6 allows the screw 44 to be threaded into the threaded hole in the rear end of the shaft 7.

The rotor 6 contains the multiple vane slots 6a, and the multiple tube holes 6b, the shaft bore 6c along with the key slot 6d. The vane slots 6a provide a close sliding fit for the multiple vanes 16, while the tube holes 6b are a larger diameter than the tubes 17, so that the tubes do not touch the holes 6b at any point during the rotation of the rotor 6. The rotor 6 is provided with multiple turbulence pockets 6e or shallow holes uniformly arranged on the circumference of the rotor between the vane slots. The pockets impart a swirling motion to the incoming air/gas mixture and contribute to more complete combustion.

The multiple vanes 16 are assembled to the tubes 17 by press fitting the tubes into the vane holes 16a. When the twin vane sets are assembled with the tubes 17 they maintain a fixed diametrical length. Since the tubes 17 do not touch the tube holes 6b the vanes 16 transmit the full thrust load to the rotor at each thrust of power. The vane sets are free to move diametrically within the vane slots 6a by the reciprocating motion of the vanes and vane seals 18 by their contact with the inside bore of the flange cylinder.

The outer end and side portions of each vane is fitted with a movable vane seal 18. Provided in the side and outer edges of each vane is a continuous rectilinear dado groove 19, in the form of a U. The vane seal 18 is also U-shaped to be of complemental form to the U-shaped groove 19, so as to have a close sliding fit there. A corrugated leaf-spring 20 is disposed between the horizontal bottom of each vane U groove 19, and the corresponding horizontal portion of the vane seal 18. The spring 20 provides the necessary pressure behind the vane seals to insure a continuous pressure contact with the inside bore of the flanged cylinder 5. It must be established that the length of the U-shaped vane seals 18 and the corresponding vanes and tubes 17 must be greater than the inside diameter of the flanged cylinder 5, in order to produce a complete continuous pressure tight seal when the engine operates.

The working length of the rotor 6 must be a close fit within the inside end flange surfaces of the flanged cylinder 5, so that no pressure leakage occurs.

The machine finish of all these operating parts must be of the order of RMS 16 or better to maintain the proper pressure sealing.

The vane seals 18 may also be made up in three pieces, consisting of one end piece and two identical side pieces. The adjacent ends of these seal pieces are half-lapped to maintain a tight, continuous seal around the vane assembly when positioned within the U groove 19.

Compound seals 18a, may be used, as previously described, which consist of multiple sealing strips connected by support strips. When compound seals are utilized for higher compression engines the vanes 16 must be somewhat wider to accommodate this increased seal width, and the vane slots 6a correspondingly wider.

The area of the crescent intake/exhaust opening 21 formed by the difference in the diameter of the rotor 6 rounded ends and the opening formed by the end flanges of the flanged cylinder 5, may be varied to suit the particular engine performance characteristics. It should be realized that the engine compression ratio is determined by the gas volume formed by the intersection of the rotor diameter and the opening in the flange ends of the flanged cylinder 5. This condition exists since the vanes in their sweep across the crescent area provide a fixed angular cutoff point for the gas (air/fuel mixture) entrance at this intersection point.

In a similar manner the power phase ends when the vanes pass over the identically opposite intersection point, by allowing the exhaust gasses to escape into the crescent-shaped area and then out into the exhaust manifold.

The stepped-end portion 6f of the rotor 6, along with the corresponding raised crescent shapes 22, on the inside surfaces of the end plates 10 and 11, as shown in the drawings, define the full intake exhaust crescent area.

It should be noted that the inside faces of the raised crescent shapes 22 do not touch the end faces of the rotor so that there is no friction between them.

If necesary a shaped lubrication liner 23 or Teflon insert may be bonded to this surface to prevent the exhaust gasses from escaping at this area.

A non-contacting, labyrinth type of sealing arrangement may be employed in this exhaust area if deemed more effective for specific engine arrangements, than the shaped lubrication liner 23.

Each of the gas film rollers 3 is fitted with air impellers 32, which provide a forced air flow for cooling the flanged cylinder 5. The impellers 32 are secured to the outer race of the rollers 3 to revolve freely with them. The roller shells 2, enclose the air impellers 32, and are provided with air inlets 33 and air outlets 34 within the half-cylindrical portion of the said shell 2.

Multiple spark plugs 24 are uniformly spaced on the outside of the flanged cylinder 5 and threaded into the cylinder wall. The number of spark plugs coresponds to the number of vanes and vane cavities. More than one plug may be provided per cavity but these should be aligned axially on the cylinder to maintain an optimum firing angle. It should be noted that these are special spark plugs of extremely short height, so that they do not require a large air gap between the main housing 1, inside diameter and the outside diameter of the flanged cylinder 5.

An ignition electrode 25 is located on the main engine housing 1 at the exact firing angle required for optimum combustion conditions. A flexible conductor strip 26 within the air gap—between the inside diameter of the main housing 1 and the outside diameter of the flanged cylinder 5, contacts the top point of the spark plug to transmit the high voltage and cause firing at this position.

A flexible conductor strip 26, is required to provide positive contact with the spark plug in any shifted position of the flanged cylinder 5, within the bearing tangency perimeter.

It should be noted that the engine can be made to run in either direction by placing the ignition electrode 25 at an equal and opposite angular position at the top of the main engine housing 1. The grounding of the ignition circuit is accomplished by the addition of grounding strips 35, mounted on the inside diameter of the main housing 1 which contact the revolving outside diameter of the flanged cylinder 5.

The main engine housing 1 is provided with mounting lugs 1a for mounting the engine to any convenient mounting arrangement. The main housing 1 has equally spaced elongate slots 1b for the entrance of the gas film rollers 3.

Since it is desirable to have a fixed rotational relationship between the rotor 6 and the flanged cylinder 5, a thin ring gear 27 may be secured to the inside endface of the flanged cylinder which will mesh with the thin end gear 28, secured to one end of the rotor 6.

A ring gear 27 may be cut into the inside diameter of the end flange of the flanged cylinder, which will mesh with a corresponding gear 28 cut into the stepped end diameter of the rotor 6. This latter arrangement is more desirable since there is no interference within the vane and inside flange cylinder area.

The non-geared type of compound rotary engine, shown in FIGURES 1 and 2, may have elongate notches 36, cut into the inside diameter of the flanged cylinder 5, which will serve to hold the revolving vanes generally oriented with respect to the firing angle 30, to insure an adequate combustion volume.

Figure 4:
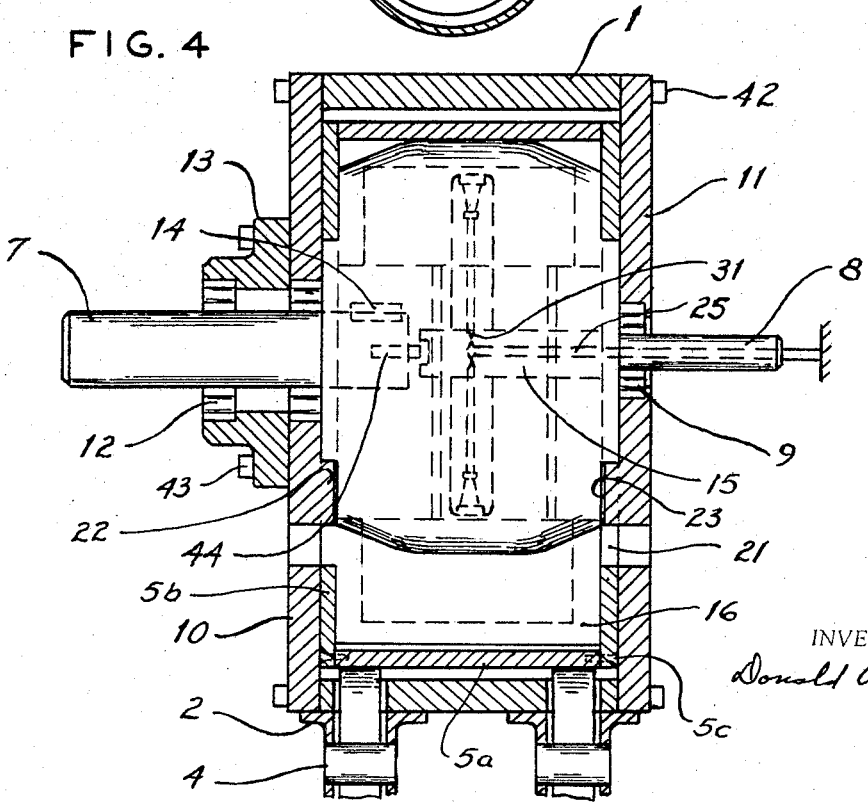
FIGURE 4 is a side sectional view through the main housing showing ignition elements within the rotor.

A variation in the ignition system comprising an internal arrangement shown in FIGURES 3 and 4, wherein the spark plugs 24 are mounted within the rotor 6, with each conducting insulated extension 29 extending into the center bore area 6f. A fixed center conductor 25 enters the hollow auxiliary shaft 8 and contacts each conducting extension 29 to complete the firing circuit. The contact point on the fixed center conductor 25 is oriented in line with the firing angle 30, so that as each contact point 31 on the conducting extension 29 touches the contact point ignition occurs within the combustion cavity. The fixed conductor 25, is supported by a bracket (not shown) which is secured to the end plate 11. All of these conductors carry high tension so must be suitably insulated from adjacent grounded metal parts.

Figure 7:
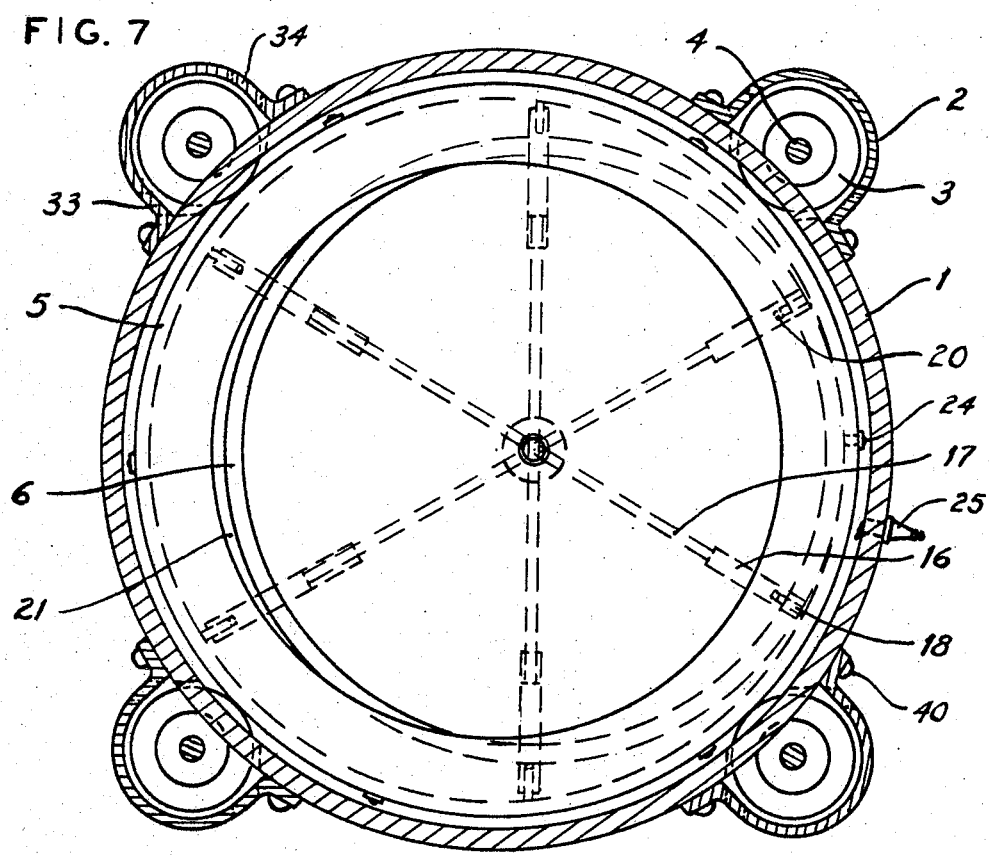
FIGURE 7 is a top sectional view through a compound gyroscopic type of I.C. engine.
Figure 8:
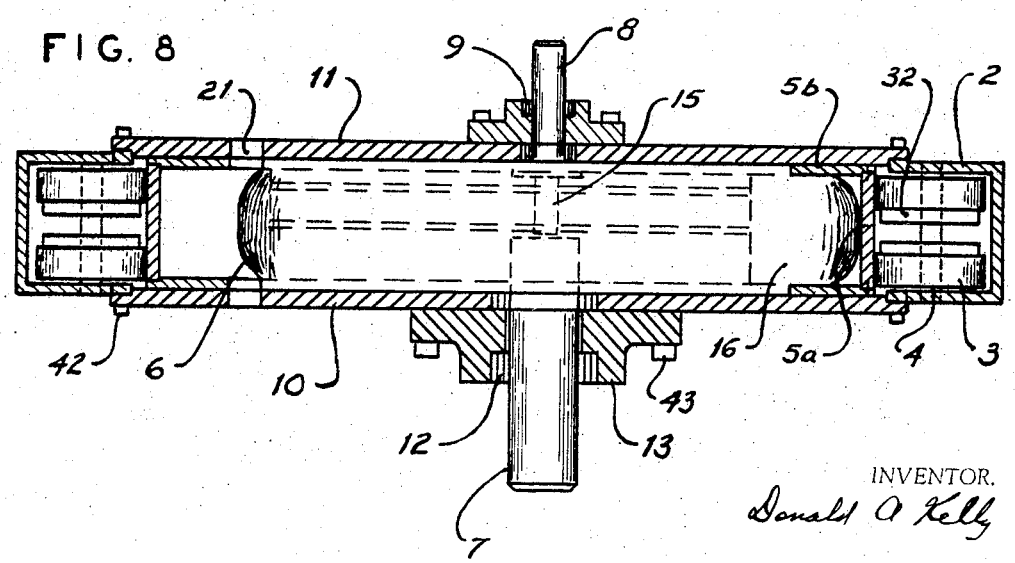
FIGURE 8 is a side elevation view through a compound gyroscopic type I.C. engine.

A gyroscopic type of compound rotary engine shown in FIGURES 7 and 8, is expected to meet special applications in the marine and high-speed locomotive fields where an efficient combined prime mover and stabilization means would be advantageous.

The gyroscopic engine would have the identical components and general arrangement as the basic compound rotary engine but varies in that its diameter to width (or height) proportions would be greater in order to achieve a gyroscopic effect for the engine at high speeds. Either of the two ignition systems may be employed as previously described and the rotor and flanged cylinder may be geared together as described. The intake/exhaust crescent area and rotor end rounding may be varied to produce optimum combustion conditions.

Another basic difference in the gyroscopic engine is the number of operating sealed vanes which must be greater due to the increased rotor diameter. Since there is a limit to the effective length that the expanding gas can travel, additional vanes and therefore combustion cavities are in order.

The gyroscopic type engine has the configuration for taking greater advantage of the compound rotary engines natural low seal wear feature, while producing a greater torque-to-weight ratio due to the increased moment arm for a given power thrust.

The gas film rollers 3 size and type is quite critical for the gyroscopic type of engine and should not be less in size than the proportions previously described in the basic compound rotary engine.

The associated electrical, fuel inlet, exhaust conduction means and auxiliary cooling systems employed with the above described compound rotary engine are generally conventional and therefore have not been illustrated.

The engine may be supercharged for certain applications by adding a powered air ram at the air inlet side of the air filter. A regular I.C. type carburetor would be utilized for supplying the air/fuel mixture to the intake portion of the crescent-shaped openings. A fuel injection arrangement may be advantageous for certain applications and would be mounted by the same means as the carburetor.

The exhaust stacks and blower chambers are connected from the crescent-shaped openings. The blower chamber and blower are included in the engine system to increase the operating efficiency by rapid exhaust removal and as a complete combustion aid for anti-pollution considerations. The blower is arranged on the blower chamber to force the exhaust stream in the direction of the exhaust outlet. The arrangement provides the advantage of forcing the exhaust stream through the baffling effect of the muffler, thereby relieving some back pressure on the exhaust gas stream being pumped from the engine exhaust cavities.

The starter motor would be connected either directly or through a gearbox to the rear auxiliary shaft. An alternator would be belt-connected to the rear auxiliary shaft. A standard I.C. fuel pump would be utilized to supply fuel to the engine carburetor. Both air and fuel filters would be provided for clean engine operation. Most of these standard accessories are not shown in the drawings nor itemized for sake of clarity and conciseness. Many of the performance devices which are applicable to reciprocating I.C. engines may be applied to the compound rotary engine, such as idling airflow needles, oil and fuel additives and the like.

While certain novel features of the invention have been shown and described and are recorded in the annexed claims, it will be understood that various omissions, substitutions, and changes in configuration and details of the engine and its operation can be made by those skilled in the art without departing from the spirit and scope of the invention.

What is claimed is:

1. In a rotary internal combustion engine, a cylindrical housing containing multiple slotted openings, multiple low-friction rollers within said slotted openings, support housings for said low-friction rollers disposed over said multiple slotted openings, shaft means within said multiple low-friction rollers, holes within said support housings for accepting said roller shaft means, an end-flanged cylinder of constant outside diameter rotatably associated with said low-friction rollers and axially restrained by said low-friction rollers; a slotted and bored cylindrical rotor in tangent contact with the upper inside diameter of said end-flanged cylinder of constant outside diameter resulting in a crescent-shaped working cavity, drive shafts radially and axially secured within the centerbore at both ends of the said slotted and bored cylindrical rotor, two identical end plates fastened at each end of said cylindrical housing, bearing means within the said identical end plates supporting said drive shafts and slotted/bored cylindrical rotor, multiple radially disposed slotted vanes closely fitted within the slots of said slotted and bored cylindrical rotor, elongate tubes connecting opposite sets of said slotted vanes within the bores of said slotted and bored cylindrical rotor, interlocking rectangular sealing elements closely fitted into the corresponding slots of said slotted vanes, leaf springs fitted behind said interlocking rectangular sealing elements, crescent-shaped intake/exhaust openings formed by the intersection of said slotted and bored cylindrical rotor and the opening diameter within said end-flanged cylinder of constant outside diameter, coincident openings within said identical end plates corresponding to the said crescent-shaped intake/exhaust openings.

2. The combination set forth in claim 1 including multiple spark plugs uniformly disposed around the said end-flanged cylinder of constant outside diameter corresponding to the number of vane cavities, an ignition contact secured to the outside diameter of said cylindrical housing disposed at an angle of from ten to twenty degrees off top dead center, said ignition contact making contact with each of said rotating multiple spark plugs.

3. The combination set forth in claim 1 including stepped end diameters and radii on each of said slotted and bored cylindrical rotor co-acting with raised crescent-shaped volumes on the inside surface of said identical end plates thereby defining the full areas of said crescent-shaped intake/exhaust openings.

4. The combination set forth in claim 1 including air impeller means on the side of the outer race of said low-friction rollers revolving freely with said outer race, inlet and outlet openings on the periphery of the said low-friction rollers support housings.

5. The combination set forth in claim 1 wherein said slotted and bored cylindrical rotor is provided with multiple turbulence pockets uniformly disposed on the circumference between the said slotted vanes.

6. The combination set forth in claim 1 wherein the said spark plugs would be equally spaced within the said slotted and bored cylindrical rotor, conductor strips extending from the said spark plugs to the said centerbore area, external conduction means extending into a cavity within one of said drive shafts, a contact point on said external conduction means which touches each of said spark plug conduction strips.

7. The combination set forth in claim 1 wherein the said sealing elements are of one piece construction in the form of a U closely fitted into the corresponding slots of said slotted vanes.

8. In a rotary internal combustion engine, a vertical axis cylindrical housing whose diameter to width ratio is of the order of fifteen to one, multiple slotted openings within said cylindrical housing, multiple low-friction rollers within said slotted openings, support housings for said low-friction rollers disposed over said multiple slotted openings, vertical shaft means within said multiple low-friction rollers, holes within said support housings for accepting said vertical shaft means, and end-flanged cylinder of constant outside diameter rotatably associated with said low-friction rollers and axially restrained by said low-friction rollers, a slotted and bored cylindrical rotor with vertical axis in tangent contact with the upper inside diameter of said end-flanged cylinder of constant outside diameter forming a crescent-shaped working cavity, vertical disposed drive shafts radially and axially secured within the centerbore at both ends of the said slotted and bored cylindrical rotor, two identical end plates fastened at each end of said cylindrical housing, bearing means within said identical end plates supporting said drive shafts and slotted/bored cylindrical rotor, multiple radially disposed slotted vanes closely fitted within the slots of said slotted and bored cylindrical rotor, elongate tubes connecting opposite sets of said slotted vanes within the bores of said slotted and bored cylindrical rotor, interlocking rectangular sealing elements closely fitted into the corresponding slots of said slotted vanes, leaf springs fitted behind said interlocking rectangular sealing elements, crescent-shaped intake/exhaust openings formed by the intersection of said slotted and bored cylindrical rotor and the opening diameter within said end-flanged cylinder of constant outside diameter, coincidental openings within said identical end plates corresponding to the said crescent-shaped intake/exhaust openings.

9. The combination set forth in claim 8 wherein said sealing elements are of the compound type comprising multiple connected seal strips, said slotted vanes are correspondingly wider to receive the wider compound type seals.

10. The combination set forth in claim 8 wherein the number of said slotted vanes is increased in proportion to the large diameter of the said end-flanged cylinder of constant outside diameter, the diameter difference of the inside diameter of the said end-flanged cylinder of constant outside diameter in relation to the said slotted and bored cylindrical rotor is increased to produce compression ignition.

References Cited

UNITED STATES PATENTS

| | | | |
|---|---|---|---|
| 1,282,518 | 10/1918 | Althause | 123—16 |
| 1,465,881 | 8/1923 | Thoens | 230—152 |
| 1,664,987 | 4/1928 | Meyer | 91—121 |
| 2,193,178 | 3/1940 | Laythorpe | 123—8 |
| 2,864,346 | 12/1958 | Taylor | 123—16 |
| 3,205,875 | 9/1965 | Praxmarer | 123—16 |
| 3,246,574 | 4/1966 | Eickmann | 230—152 X |

DONLEY J. STOCKING, Primary Examiner.

U.S. Cl. X.R.

230—152; 103—135; 91—121